(12) United States Patent
Blumberg et al.

(10) Patent No.: US 7,987,113 B2
(45) Date of Patent: Jul. 26, 2011

(54) SYSTEM AND METHOD OF CREATING AN ADJUSTABLE COMMISSION

(75) Inventors: Brad W. Blumberg, Voorhees, NJ (US); Eric M. Blumberg, Ventnor, NJ (US)

(73) Assignee: Smarter Agent, LLC

( * ) Notice: Subject to any disclaimer, the term of this patent is extended or adjusted under 35 U.S.C. 154(b) by 1108 days.

(21) Appl. No.: 11/022,937

(22) Filed: Dec. 28, 2004

(65) Prior Publication Data
US 2005/0149419 A1    Jul. 7, 2005

Related U.S. Application Data

(60) Provisional application No. 60/532,892, filed on Dec. 30, 2003.

(51) Int. Cl.
*G06Q 30/00* (2006.01)
(52) U.S. Cl. .................. 705/14.15; 705/14.69; 705/14.7
(58) Field of Classification Search .................... 705/14, 705/10, 7, 11, 14.44, 2, 14.15, 14.69, 14.7
See application file for complete search history.

(56) References Cited

U.S. PATENT DOCUMENTS

| | | |
|---|---|---|
| 5,032,989 A | 7/1991 | Tornetta |
| 5,058,009 A | 10/1991 | Yoshino et al. |
| 5,584,025 A | 12/1996 | Keithley et al. |
| 5,594,425 A | 1/1997 | Ladner et al. |
| 5,684,859 A | 11/1997 | Chanroo et al. |
| 5,794,216 A | 8/1998 | Brown |
| 5,831,664 A | 11/1998 | Wharton et al. |
| 5,850,433 A | 12/1998 | Rondeau |
| 5,852,810 A | 12/1998 | Sotiroff et al. |
| 5,901,214 A | 5/1999 | Shaffer et al. |
| 5,930,699 A | 7/1999 | Bhatia |
| 5,938,721 A | 8/1999 | Dussell et al. |
| 5,944,769 A | 8/1999 | Musk et al. |
| 5,970,478 A | 10/1999 | Walker et al. |
| 6,009,413 A | 12/1999 | Webber et al. |
| 6,014,645 A | 1/2000 | Cunningham |
| 6,029,069 A | 2/2000 | Takaki |
| 6,115,611 A | 9/2000 | Kimoto et al. |
| 6,115,690 A * | 9/2000 | Wong .............................. 705/7 |
| 6,122,520 A | 9/2000 | Want et al. |
| 6,202,023 B1 | 3/2001 | Hancock et al. |
| 6,321,202 B1 * | 11/2001 | Raveis, Jr. ........................ 705/1 |
| 6,343,275 B1 * | 1/2002 | Wong .............................. 705/26 |

(Continued)

FOREIGN PATENT DOCUMENTS

GB    2357167 A    6/2001

(Continued)

OTHER PUBLICATIONS

STICSearch Aug. 12, 2009.*

(Continued)

*Primary Examiner* — John G Weiss
*Assistant Examiner* — Adam Chornesky
(74) *Attorney, Agent, or Firm* — Cooley LLP

(57) ABSTRACT

A method of determining a commission comprises providing a plurality of selectable variables. The plurality of variables are associated with an asset. A commission associated with a sale of the asset based at least partially on a selection of at least one variable from the plurality of variables is calculated. Calculating the commission includes assigning a value to each variable selected from the plurality of variables.

13 Claims, 4 Drawing Sheets

U.S. PATENT DOCUMENTS

| | | | |
|---|---|---|---|
| 6,343,317 B1 | 1/2002 | Glorikian | |
| 6,385,541 B1 | 5/2002 | Blumberg et al. | |
| 6,456,852 B2 | 9/2002 | Bar et al. | |
| 6,460,036 B1 | 10/2002 | Herz | |
| 6,484,176 B1 | 11/2002 | Sealand et al. | |
| 6,496,776 B1 | 12/2002 | Blumberg et al. | |
| 6,542,812 B1 | 4/2003 | Obradovich et al. | |
| 6,552,682 B1 | 4/2003 | Fan | |
| 6,564,143 B1 | 5/2003 | Alewine et al. | |
| 6,578,010 B1 * | 6/2003 | Teacherson | 705/14 |
| 6,587,835 B1 | 7/2003 | Treyz et al. | |
| 6,594,633 B1 | 7/2003 | Broerman | |
| 6,625,457 B1 | 9/2003 | Raith | |
| 6,636,803 B1 | 10/2003 | Hartz, Jr. et al. | |
| 6,650,902 B1 | 11/2003 | Richton | |
| 6,836,667 B1 | 12/2004 | Smith, Jr. | |
| 6,898,434 B2 | 5/2005 | Pradhan et al. | |
| 6,912,507 B1 | 6/2005 | Phillips et al. | |
| 6,973,432 B1 | 12/2005 | Woodard et al. | |
| 7,024,205 B1 | 4/2006 | Hose | |
| 7,069,238 B2 | 6/2006 | I'Anson et al. | |
| 7,072,665 B1 | 7/2006 | Blumberg et al. | |
| 7,127,261 B2 | 10/2006 | Van Erlach | |
| 7,227,498 B2 | 6/2007 | Soliman | |
| 7,457,628 B2 | 11/2008 | Blumberg et al. | |
| 7,523,041 B2 * | 4/2009 | Chen et al. | 705/1.1 |
| 7,583,607 B2 * | 9/2009 | Steele et al. | 370/252 |
| 7,599,795 B1 | 10/2009 | Blumberg et al. | |
| 7,620,570 B2 * | 11/2009 | Albazz et al. | 705/26.61 |
| 7,801,771 B1 * | 9/2010 | Sirota et al. | 705/26.1 |
| 2001/0047282 A1 * | 11/2001 | Raveis, Jr. | 705/7 |
| 2002/0013852 A1 | 1/2002 | Janik | |
| 2002/0035609 A1 | 3/2002 | Lessard et al. | |
| 2002/0052814 A1 | 5/2002 | Ketterer | |
| 2002/0069148 A1 | 6/2002 | Mutschler et al. | |
| 2002/0077966 A1 | 6/2002 | Harycki et al. | |
| 2002/0091854 A1 * | 7/2002 | Smith | 709/236 |
| 2002/0111890 A1 | 8/2002 | Sloan et al. | |
| 2002/0152100 A1 * | 10/2002 | Chen et al. | 705/5 |
| 2002/0198779 A1 * | 12/2002 | Rowen et al. | 705/14 |
| 2003/0014402 A1 | 1/2003 | Sealand et al. | |
| 2003/0069029 A1 | 4/2003 | Dowling et al. | |
| 2003/0092450 A1 | 5/2003 | Juppi et al. | |
| 2003/0200108 A1 | 10/2003 | Malnoe | |
| 2004/0139049 A1 | 7/2004 | Hancock et al. | |
| 2005/0059410 A1 | 3/2005 | Trossen et al. | |
| 2005/0149419 A1 * | 7/2005 | Blumberg et al. | 705/35 |
| 2006/0006990 A1 | 1/2006 | Obradovich | |
| 2006/0190325 A1 * | 8/2006 | Tarsh | 705/14 |
| 2007/0005481 A1 * | 1/2007 | Kedia et al. | 705/37 |
| 2007/0050263 A1 | 3/2007 | Horimoto | |

FOREIGN PATENT DOCUMENTS

| | | |
|---|---|---|
| JP | 7-65070 A | 3/1995 |
| JP | 07-065070 A * | 3/1995 |

OTHER PUBLICATIONS

"SnapTrack Awarded Patent for Locating or Tracking Wireless Devices Via Internet and Client-Server-Based Computer Networks",http://famulus.msnbc.com/famuluscom/businesswire01-23-050325.asp?sym=QCOM, Jan. 23, 2001.

"Lucent Technologies and Profilium Inc. Announce Alliance Agreement to Deploy Advanced Location-Based Mobile Advertising Solution", http://www.hoovershbn.hoovers.com/bin/story?StoryId=CoM0p0bKbytiXmdi&FQ=c....%20L Jan. 23, 2001.

"The Meaning of Telematics", http://www.globaltelematics.com/telematics.htm, Oct. 30, 2000.

HomeFinder—Find the Home That's Right for You from http://www.homefinder.com.

Printout from http://www.homescape.com/buying/.

zipRealty.com: The zipRealty.com Buyer's Advantage from http://www.ziprealty.com/buy_a_home/advantage.jsp.

Homes for Sale—MSN HomeAdvisor from http://homeadvisor.msn.com/homes/overview.asp.

REALTOR.com: Real Estate—Find a new home and a realtor from http://www.realtor.com/FindHome/default.asp.

REALTOR.com: Real Estate—Homes for Sale in New Jersey from http://www.realtor.com/newjersey/nbselnj.asp.

REALTOR.com: Real Estate—Homes for Sale in Atlantic City from http://www.realtor.com/atlanticcity/nbregion4.asp.

REALTOR.com: Find a Home—Select Property Type from http://www.realtor.com/PropType.asp?pgnum=1&st=nj&frm=bycomm&mls=atlanticcity&mlsttl=Atlantic+City&comm.

REALTOR.com: Real Estate in Bay Area from http://www.realtor.com/selectnb.asp?frm=bycomm&st=nj&mls=atlanticcity&mlsttl=Atlantic+City&comm=Bay+Area&.

REALTOR.com: Real Estate—Find a Neighborhood from http://www.realtor.com/FindNeig/default.asp.

Hsieh et al. "Can Free Entry Be Inefficient? Fixed Commissions and Social Waste in the Real Estate Industry", Journal of the Political Economy, Oct. 2003, vol. 111, No. 5; pp. 1076-1122.

Harney, R. "Disclosing the Under-7 Percent Solution" Washington Post, May 17, 2003 [online] Washington, D.C. [retrieved on May 11, 2010] Retrieved from the Internet URL>http://pqasb.pqarchiver.com/washingtonpost/access/337697961.html; 2 pages.

* cited by examiner

SYSTEM AND METHOD OF CREATING AN ADJUSTABLE COMMISSION

CROSS-REFERENCE TO RELATED APPLICATIONS

This application claims priority under 35 U.S.C. 119(e) to U.S. Provisional Application Ser. No. 60/532,892 entitled "System and Method of Creating an Adjustable Real Estate Commission," filed on Dec. 30, 2003, the content of which is incorporated herein by reference in its entirety.

BACKGROUND

The invention relates generally to a system and method of calculating a commission and in particular to a system and method of creating an adjustable commission based on a selection of variables.

A variety of different real estate services are available to owners of real property who wish to sell their property. A typical real estate commission is based on the selling price of the real estate and is generally expressed as a percentage of the selling price (typically around 5-7% of the selling price). The commission is typically split between the selling agent and broker and the buying agent and broker. In some instances, the selling agent and broker and the buying agent and broker are the same. In the typical commission transaction, the commission is one fee that covers all expenses associated with selling the property. Such expenses may be associated with advertising, marketing, administrative matters, travel expenses, etc.

Recently, other options for selling property have become available to real property owners through discount brokers and discount real estate sales agents (collectively "discount service providers"). Discount service providers may provide a set fee for selling the real property, rather than a commission based on a percentage of the sales price of the real property. The set fee is typically much lower than 5-7% of the selling price. Other discount service providers may offer selected services, such as placing the real property on the Multiple Listing Service (MLS), providing advertising signs to be placed on the property, and placing advertisements in newspapers. In such an arrangement, the seller may be responsible for selling the real property on their own (i.e., without the assistance of a real estate agent). In other cases, the owner may offer a percentage commission to an agent for bringing a buyer to the property. This commission is usually half of the typical overall percentage (approximately 3-4%). Such services are available from, http://www.forsalebyowner.com, http://www.realestatecafe.com, http://www.helpusell.com, and http://www.assist2sell.com.

Typically, the services described above, are provided with little or no flexibility as to what services the owner of the real property needs. In some cases, the owner of real property may not receive certain services they need or want. In other cases, the owner may receive services they do not need, yet the cost is usually not adjusted. These services do not consider real time events that can impact the commission rate.

In most real estate sales situations, there are a variety of factors that affect how fast the property will sell and what selling price can be obtained. Some of these factors include location of the property, condition of the property, and conditions related to the economy, such as interest rates for mortgages. Yet, the commission and/or fees are typically the same regardless of these factors. Also, as economic and market conditions change, as well as changed circumstances for the owner of the property, the services needed by the owner may also change. For example, a property that sells in two weeks has lower marketing costs than one that sells over a period of several months.

Thus, there is a need for a method for providing a real estate commission or fee that can be custom designed to meet the requirements of the particular owner of the property. There is also a need for a method of providing a commission or fee that is adjustable as factors and conditions change that may affect the sale of the property.

SUMMARY OF THE INVENTION

A method of determining a commission includes providing a plurality of selectable variables. The plurality of variables are associated with an asset. A commission associated with a sale of the asset based at least partially on a selection of at least one variable from the plurality of variables is calculated. Calculating the commission includes assigning a value to each variable selected from the plurality of variables.

DETAILED DESCRIPTION

A method of determining a commission includes providing a plurality of selectable variables. The plurality of variables are associated with an asset. A commission associated with a sale of the asset based at least partially on a selection of at least one variable from the plurality of variables is calculated. Calculating the commission includes assigning a value to each variable selected from the plurality of variables.

Figure 1:
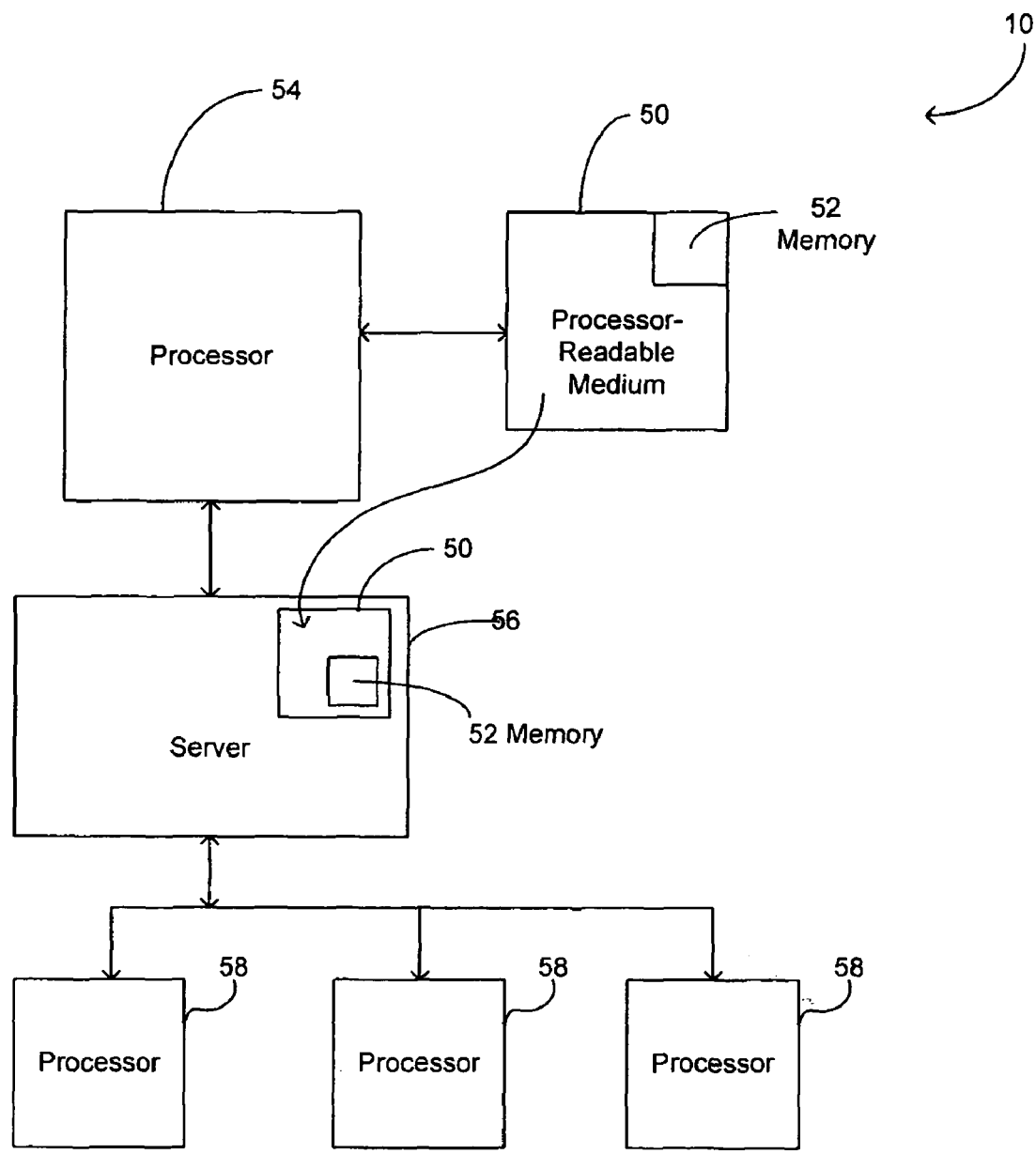
FIG. 1 is a schematic illustration of a system according to an embodiment of the invention.

FIG. 1 is a schematic illustration of a system according to an embodiment of the invention. A system 10 includes a processor-readable medium 50 storing code representing instructions to cause a processor 54 to perform a process. The code is configured to provide a plurality of selectable variables associated with an asset transaction. The code is further configured to calculate a commission associated with a sale of the asset based at least partially on a selection of at least one variable from the plurality of variables. The calculating of the commission can include, among other things, assigning a value to each variable selected from the plurality of variables. The processor 54 is in communication with processors 58 through a server 56, via a network such as the Internet as described in more detail below. The server 56 includes a processor-readable medium 50 storing the code and provides access to the code via a network.

The processor 54 (and other processors 58) can be, for example, a commercially available personal computer, or a less complex computing or processing device that is dedicated to performing one or more specific tasks. For example, the processor 54 can be a terminal dedicated to providing an interactive graphical user interface (GUI). The processor 54, according to one or more embodiments of the invention, can be a commercially available microprocessor. Alternatively, the processor 54 can be an application-specific integrated circuit (ASIC) or a combination of ASICs, which are designed to achieve one or more specific functions, or enable one or more specific devices or applications. In yet another embodiment, the processor 54 can be an analog or digital circuit, or a combination of multiple circuits.

The processor 54 can include a memory component 52. The memory component 52 can include one or more types of memory. For example, the memory component 52 can include a read only memory (ROM) component and a random access memory (RAM) component. The memory component 52 can also include other types of memory that are suitable for storing data in a form retrievable by the processor 54. For example, electronically programmable read only memory (EPROM), erasable electronically programmable read only memory (EEPROM), flash memory, as well as other suitable forms of memory can be included within the memory component 52. The processor 54 can also include a variety of other components, such as for example, co-processors, graphic processors, etc., depending upon the desired functionality of the code.

The processor 54 is in communication with the memory component 52, and can store data in the memory component 52 or retrieve data previously stored in the memory component 52. The components of the processor 54 can communicate with devices external to the processor 54 by way of an input/output (I/O) component (not shown). According to one or more embodiments of the invention, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCCI) ports, and so forth. Additionally, the I/O component can include, for example, wireless connections, such as infrared ports, optical ports, Bluetooth® wireless ports, wireless LAN ports, or the like.

The processor 54 may be connected to a network, which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

Figure 2:
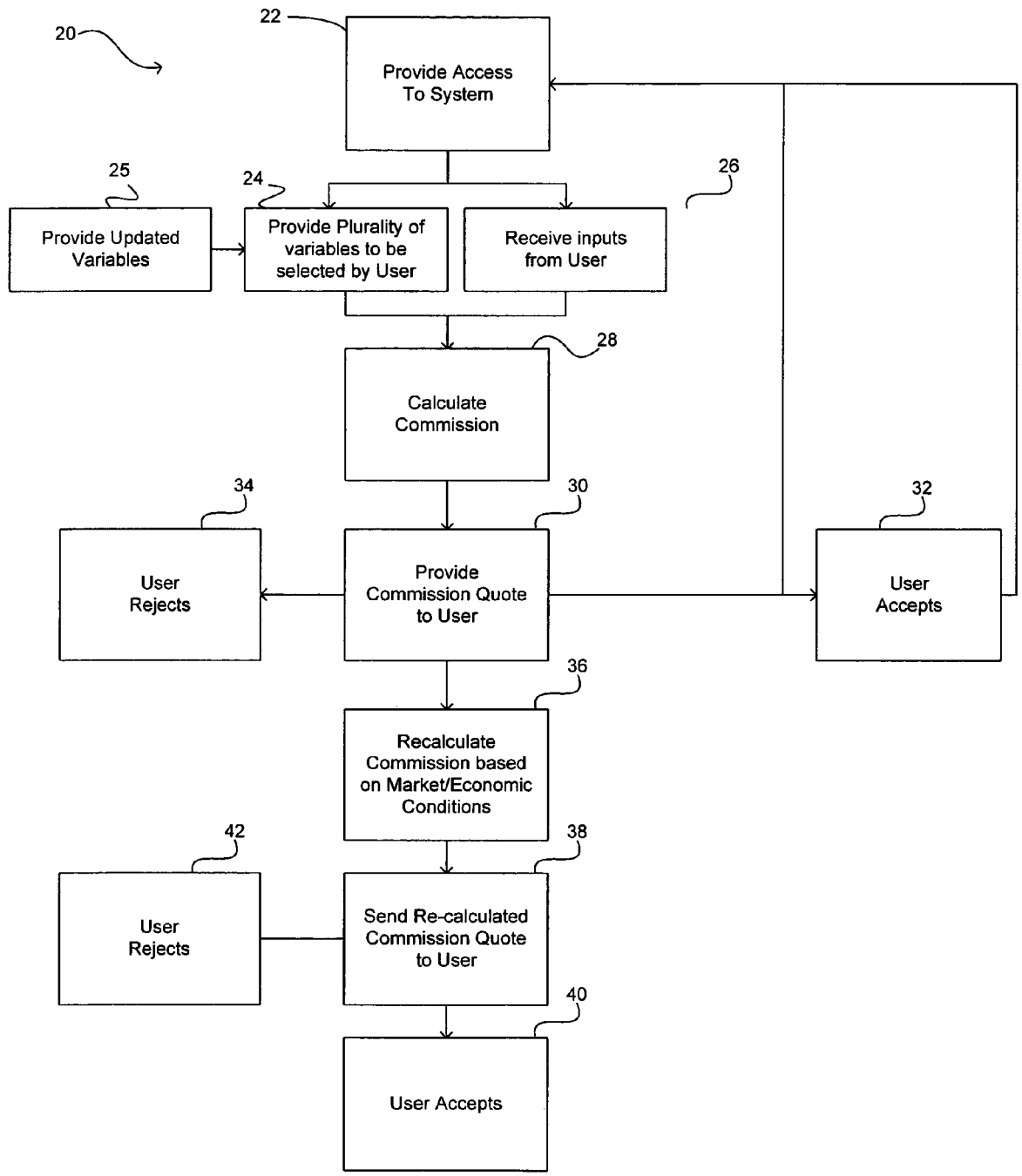
FIG. 2 is a flow diagram illustrating a method according to an embodiment of the invention.

Referring to FIG. 2, a flow diagram of a method according to an embodiment of the invention is illustrated. A method 20 includes providing access to the system 10 at step 22. In the illustrated embodiments, the method is associated with the sale of real property; however, it is to be understood that the method can be implemented for the sale of other assets and services as well. For example, the method may be used for services such as cleaning/maid services, child care services, car sales, Internet sales and Internet auction sales, newspaper and/or magazine sales, wedding planning services, etc. In one embodiment, a real estate firm may have access to the system 10 through a processor 54 as described above, such as a personal computer. A real estate agent may access the system 10, or provide an owner of real property access to the system 10 via the processor 54.

Alternatively, the system 10 may be available through the Internet or other network and accessible by multiple users. The users may include real estate agents or broker agents, or real property owners interested in selling their real property. A real estate agent may be working with an owner of real property and interact with the system 10 on behalf of the owner.

A plurality of variables to be selected by the user are provided at step 24. The plurality of variables may be automatically updated at step 25. The updates can be based on changes associated with the variables, such as changes in the costs of a particular service, changes in location of a service, and the like. Data associated with an asset, such as real property, are received at step 26. The data is entered by the user and may include, among other things, the expected sales price of the real property, the location of the real property, the expected timing for the sale of the real property, and the like.

The plurality of variables may include a variety of factors that can affect the costs associated with the sale of real property. Some examples of these variables include, but are not limited to: market and/or economic conditions, such as mortgage interest rates; the price and geographic location of the real property to be sold; variables detailing the amount of labor, advertising, and marketing involved in selling the property; advertising expenses (i.e. printed medium, radio, television or Internet-based advertising); administrative costs, such as administrative personnel; the costs of third party independent contractors and consultants; the timing of the sale; and variables related to the amount of profit the real estate agent and brokerage firm expects to receive. Other variables may include services related to mortgages, moving of household goods, etc.

The plurality of variables may be provided as individual variables for which the user makes a selection, or may be bundled into packages to be selected by the user. For example, variables may be grouped according to a particular service and/or product level and may be individually selected. In another example, the variables can be grouped according to categories of services and/or products. Within a particular package or grouping of products and/or services, the user can add or delete options from the package to further customize the package to meet the user's needs.

Table A illustrates an example list of variables and the associated value or cost assigned to each variable. Table B illustrates an example list of variables in the form of questions and/or choices for which the user makes selections according to the user's particular needs. When the user makes a selection, the value associated with that selection will be incorporated into the calculation of the commission. Table C illustrates an example set of packages of variables grouped into categories of services and/or products. Table D illustrates an example set of packages of variables grouped by level of service and/or products. For example, the premium listing services package provides more services and products than the traditional and basic service listings and will generally be offered at a higher cost to the user.

TABLE A

| Variable | Value |
|---|---|
| Appraiser's Valuation Fee | 300 |
| Professional "Prepper" | 400 |
| Inspection Report | 300 |
| Disclosure Statement | 100 |
| Guide to Selling Your Home | 0 |
| Lawn Sign | 55 |
| Directional Sign | 20 |
| Brochure Box | 50 |
| Keybox | 50 |
| Brochure Design (hrs) | 4 |
| Realtor Distribution Cost | 500 |
| Neighborhood Dist. Cost | 500 |
| MLS Listing Fee | 250 |
| Photography Fee | 100 |
| 3D Tour Fee | 150 |
| Talking House Unit Rental | 40 |
| Realtor.com ® Featured Home | 229 |
| eBay ® Auction | 400 |

TABLE A-continued

| Variable | Value |
| --- | --- |
| House Showing | 1125 |
| Buyer Feedback | 280 |
| Buyer Screening | 1125 |
| Buyer Pre-Qualification | 200 |
| Attorney Services | 1200 |
| Professional Negotiator | 1000 |
| Title Coordination | 200 |
| Moving Coordination | 1000 |

TABLE B

| Valuation | Input |
| --- | --- |
| Your Estimated House Value | 200,000 |
| Do you want a realtor? | yes |
| Condition of House | good |
| Home Improvements | |
| Recommendations | both |
| Contractor Selection | yes |
| Professional House Prepper | no |
| Hardware | |
| Lawn Sign | yes |
| Directional Sign | no |
| Brochure Box | no |
| Keybox | no |
| Marketing | |
| Printed Advertisements | yes |
| Photographs | yes |
| 3D House Tour | no |
| Internet Marketing | |
| Realtor.com | yes |
| Ebay Auction | no |
| Negotiation and Contract | |
| Buyer Pre-Qualification | no |
| Attorney Services | no |
| Professional Negotiator | no |

TABLE B-continued

| Valuation | Input |
| --- | --- |
| Closing Coordination | |
| Title Coordination | no |
| Moving Coordination | no |

TABLE C

LEGAL DISCLOSURES/CONSULTATION

Provide Legal Disclosures and Guidance
Research and Prepare Property Info and Plat

HOME PREPARATION AND PRICING

Professional in-home CMA and Price Recommendation
Email Updates on Neighborhood Real Estate Activity
Custom Literature
Home Preparation Consultation

HOME MARKETING

MLS Listing
Realtor.com Enhanced Showcase Listing
Personal Webpage
TV Listing in Home Preview Channel
Digital Photos
Yard Sign
Electronic Lockbox
Directional Signs
Brochure Box

NEGOTIATIONS AND CONTRACTS

Receive All offers on your behalf
Prepare and Review Offer comparison Chart
Prepare Seller's Net Sheet for Every Offer
Professional Negotiation of Sale Contract
Advice on Contingencies and Contract Addenda
Ensure Contract is Complete and Ratified

TROUBLESHOOTING AND SETTLEMENT

Track Contract Contingencies and Deadlines
Schedule inspection and Appraisal Appointments
Ensure Contingency Removal ASAP
Attend Final Walk-Through Inspection
Review HUD-1 Settlement Statement
Accompany you to settlement

TABLE D

| Premium Listing Services | Traditional Service Listing | Basic, Bare-Bone Listing |
| --- | --- | --- |
| Preparing For Sale | Preparing For Sale | Preparing For Sale |
| Valuation | Valuation | Valuation |
| CMA - Professional Appraiser | CMA - Realtor | CMA - Realtor |
| Tax assessments | Gathering Property Information | Gathering Property Information |
| Costs Approach | Obtain Legal Description | User filled Property Fact Sheet |
| Income Approach | Measure Square Footage | You take digital photos |
| Gathering Property Information | Prepare Property Fact Sheet | Improvement recommendations |
| Obtain Legal Description | Net proceeds assessment | Contractor selection |
| Measure Square Footage | We take the photos | Disclosure statement |
| Prepare Property Fact Sheet | Inspection reports | |
| Other Property Info | Disclosure statement | |
| We take the photos | | |
| 3D Tour | Improvement recommendations | |
| Inspection reports | Interior & Exterior | |
| Disclosure statement | Contractor Recommendation | |
| Improvement recommendations | | |
| Professional House Prepper | | |
| Guide to selling your home | | |
| Book and other literature | | |
| Hardware | Hardware | Hardware |
| Yard Sign | Yard Sign | Basic Yard Sign |
| 3 Directional Signs | 2 Directional Signs (when possible) | |
| Brochure box | Brochure box | |
| Keybox | Basic keybox | |

TABLE D-continued

| Premium Listing Services | Traditional Service Listing | Basic, Bare-Bone Listing |
|---|---|---|
| Marketing | Marketing | Marketing |
| Print advertisements | Brochures, Fliers & Feature Sheets | Publicity to local area agents |
| Available at cost | Design and production by realtor | Emails |
| Brochures, Fliers & Feature Sheets | 200 brochures included | |
| Development and Design | Delivered to: | MLS listing |
| 200 brochures included | Neighborhood | Listing provided |
| Delivered to: | Local Realtors | Listing on all Internet MLS sites |
| Neighborhood | Publicity to local area agents | Featured Home on SA website |
| Local Realtors | Emails | |
| Publicity to area agents | MLS listing | |
| Email | We handle everything | |
| Calls | Listing on all MLS Internet sites | |
| Open house | | |
| Talking house Unit | | |
| MLS listing | | |
| We handle everything | | |
| 3% to selling agent | | |
| Internet marketing | Internet marketing | Internet marketing |
| Realtor.com | Realtor Website | None |
| Featured home | Featured home | |
| Open House Announcement | Highlighted home | |
| Realtor Website | | |
| Featured home | | |
| 3D Tour | | |
| Ebay Auction if desired | | |
| House Showings | House Showings | House Showings |
| We Show | You show/Selling Agent shows | You show/Selling Agent shows |
| Buyer Pre-screening | Buyer feedback tracking | You control the scheduling |
| Public open house | | |
| Guard needed - extra | | |
| Buyer feedback tracking | | |
| Negotiation & Contract | | |
| Handled by attorney | Negotiation & Contract | Negotiation & Contract |
| Professional Negotiator - extra | Negotiation by Realtor | Negotiation by Realtor |
| Escrow agent provided | Escrow agent provided | Escrow agent provided |
| Closing Coordination | | |
| Title coordination | Closing Coordination | Closing Coordination |
| Final walk through inspection | Title coordination | Minimum coordination |
| Moving coordination | Final walk through inspection | |
| Conditions for Listing | Conditions for Listing | Conditions for Listing |
| Exclusive listing - 12 months | Exclusive listing - 6 months | Exclusive listing - 6 months |
| House value over 500,000 | | |
| Others | Others | Others |
| Consultation line | Help desk available | Help desk available |
| Other property info includes mortgages, liens, etc. | | |
| Featured home subject to availability | | |

A user of the system selects variables from the plurality of variables that meet the user's particular needs associated with the sale of the real property. For example, the user may be an owner of real property who wishes to have a real estate agent handle the sale of his/her property. The real estate agent may provide one or more services of which the user can select only those services he or she desires. For example, the user may want to select certain advertising media, such as only posting the property for sale on the MLS. A cost may be associated with the MLS listing that will be included in a sales commission calculation. Alternatively, the user may select to have his or her property advertised for sale by having a sign posted on the property and by placing an advertisement in a local newspaper. Each variable selected by the user may have a weight or value assigned to it, such that a total sales commission can be custom calculated for the particular user depending on the variables selected.

After receiving the data input and the variables selected by the user, a commission for selling the particular real property is calculated at step 28. The commission may be in the form of a percentage of the selling price, a fixed dollar amount or a combination of both. To calculate the commission, weights or values are assigned to each of the selected variables. As the user selects certain variables, the corresponding value or weight is computed for that particular variable. The value may be a set dollar amount or may be in the form of a percentage of the selling price. In addition, the calculation may incorporate the data input by the user associated with the real property, such as the expected selling price and the timing desired for the sale. Once the commission has been calculated, a quote for the commission is provided at step 30. The user may then choose to accept the quote at step 32, reject the quote at step 34, or re-access the system 10 to adjust the variables selected and initiate recalculation of the quote at step 22.

The commission may also be affected by changing economic and/or market conditions (e.g., location of service, interest rates, availability of service). The system may automatically adjust the weights or values assigned to the selected variables based on the economic or market conditions and recalculate the commission at step 36. For example, as the average mortgage interest rate changes, the calculation of the sales commission may be automatically adjusted to reflect the change. The plurality of variables may also be interrelated such that a change in one of the selected variables may have an effect on the value of another variable.

The recalculated commission based on economic and/or market conditions can be sent to the user at step 38. The user can then decide whether to accept the adjusted commission at step 40, reject the adjusted commission at step 42, or re-access the system 10 at step 22. If the user chooses to re-access the system 10, the user can change the original selection of variables to initiate further recalculation of the commission.

In some embodiments, the user may change the selected variables at any time during the sales process. The user's needs may change while the asset is offered for sale, which may prompt the user to change the selected variables. For example, the user's timing of a move may change, the user may decide to add additional advertising methods, or the user may choose to lower the sales price. Thus, ongoing changes to the commission may be made based on the user's changing needs.

In some embodiments, the system 10 provides a limit or default for the commission amount. For example, a specified percentage of the selling price may be set as a default or cap on the commission amount (such as 3% of the selling price). The default commission can include a specified set of variables or provide the user with packaged variables as an option. After the commission is calculated based on the variables selected and the inputs provided by the user, the calculated commission can be compared to the default commission, and the lower amount can be provided as an optional quote for the user. This feature provides the user with a maximum commission quote (i.e., the 3% default), and the option of trying to create a lower commission based on the variables selected and inputs provided by the user.

Figure 3:
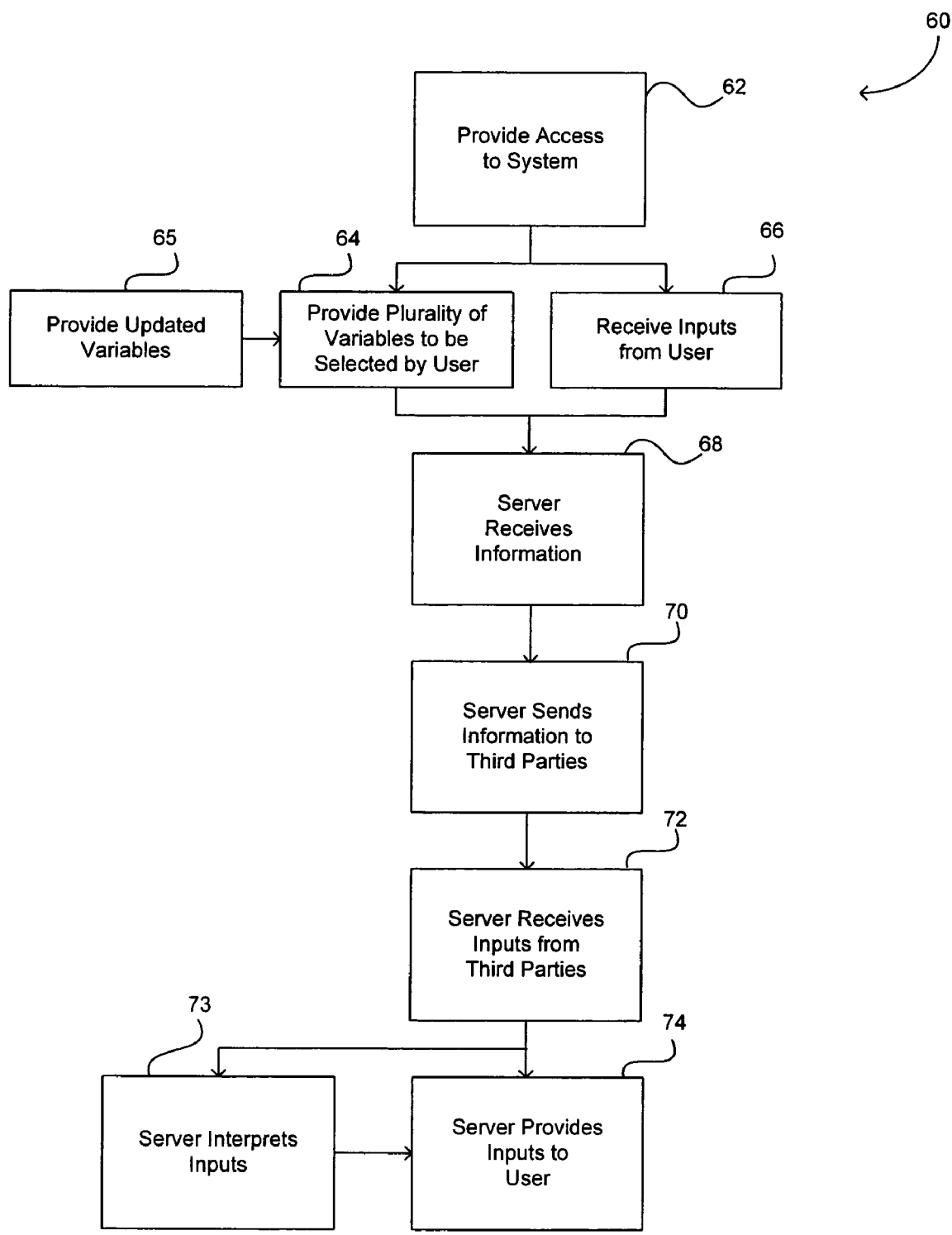
FIG. 3 is a flow diagram illustrating a method according to another embodiment of the invention.

FIG. 3 illustrates a method 60 illustrating another implementation of the invention that includes sending the information associated with the variables selected by the user and the inputs from the user to one or more third party real estate brokers or agents. In some embodiments, the processor 54 is in communication with a server 56. Server 56 is in communication with multiple processors 58. The system is provided by the server 56 via a network, such as the Internet.

In this embodiment, the system 10 is accessible via the network at step 62. A plurality of variables that can be selected by the user are provided at step 64. The plurality of variables may be automatically updated at step 65. Data inputs are received from the user at step 66. The information associated with the data inputs received and the variables selected by the user are received by the server 56 via the network at step 68. The server 56 sends the information to one or more third party real estate brokers or agents at step 70. The third party real estate brokers or agents may utilize the system 10 to calculate a quote for a commission based on the variables selected by the user and the inputs from the user associated with the real property. Thus, each third party real estate agent or broker may configure the system 10 with their particular costs, products, services and values associated with each variable. The third party real estate agents or brokers provide the quote to the server 56 at step 72. The server 56 then provides the quote information received from one or more third party real estate brokers or agents to the user at step 74. Alternatively, the server 56 can interpret the quote at step 73 and make the selection of the best quote for the user.

Figure 4:
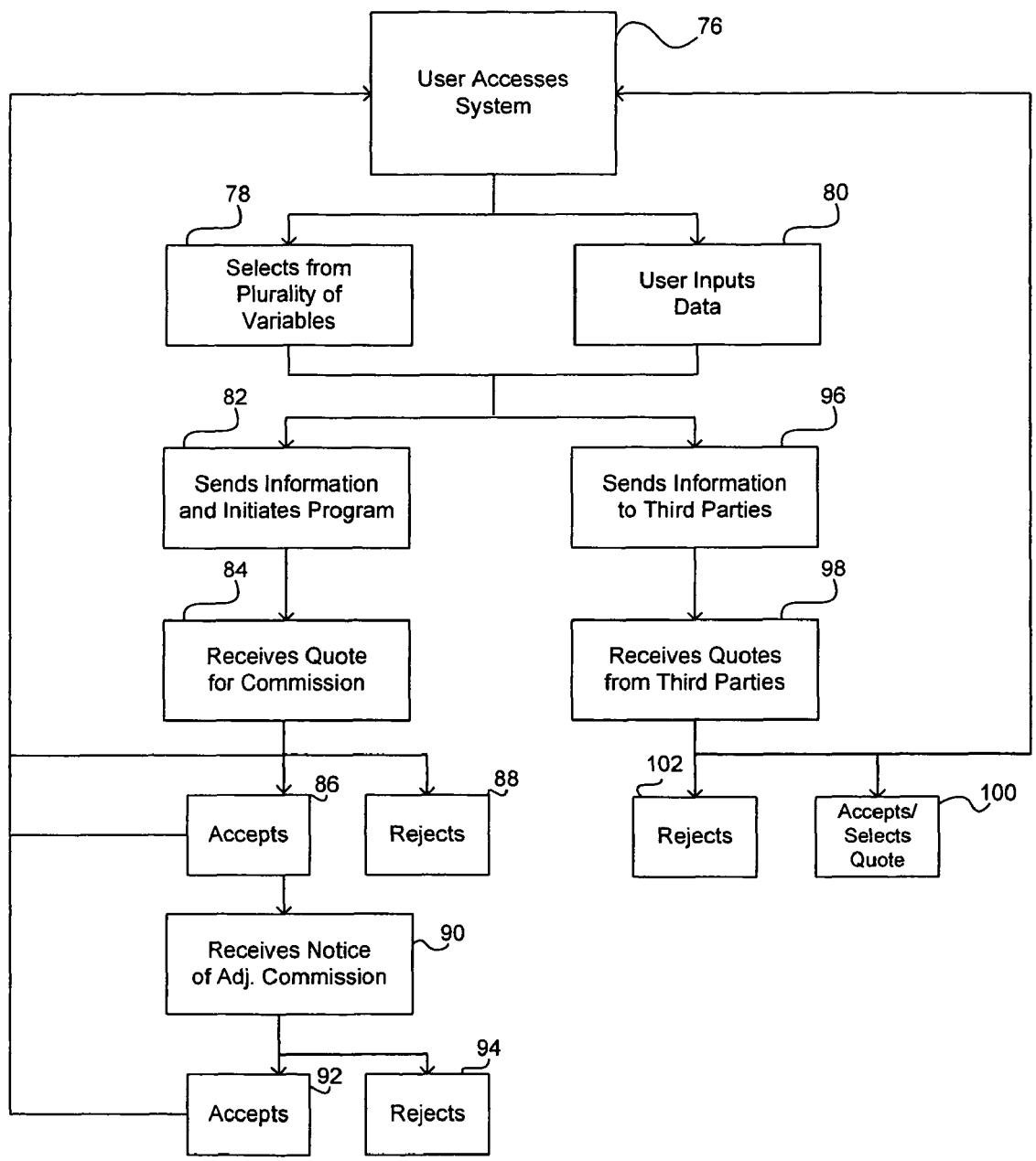
FIG. 4 is a flow diagram illustrating an implementation of the invention from a user perspective.

FIG. 4 illustrates a method of the invention from a user perspective. A user can access the system 10 via a processor 54 at step 76. The user may be an owner of an asset, such as real property, or may be a real estate agent or broker. The user selects variables associated with the real property at step 78 and inputs requested information associated with the real property at step 80. The user initiates the calculation of a commission by sending the information to be processed by the system 10 at step 82. The user then receives a quote for a commission at step 84. The user may choose to accept the quote at step 86, reject the quote at step 88, or re-access the system 10 to change the variables selected and initiate recalculation of the commission at step 76.

As described above, the commission may be automatically adjusted based on market conditions and/or other factors. If the commission is adjusted, the user may receive notification of such an adjustment at step 90. Again the user can choose to accept the adjusted commission at step 92, reject the adjusted commission at step 94, or re-access the system 10 at step 76 to change the variables selected and initiate recalculation of the commission. In addition, the user's needs may change, prompting the user to change some or all of the variables selected. In this situation, the user may re-access the system 10 at step 76 and initiate a new calculation of the commission by changing the variables selected. This enables the user to adjust the commission according to changed needs of the user.

Alternatively, the user may access the system 10 via a server 56. After selecting variables from the plurality of variables provided and inputting data associated with the asset at steps 78 and 80, the user may cause the information to be sent to one or more third party real estate agents or brokers via the server 56 at step 96. The user may then receive one or more quotes for a commission from the one or more third party agents or brokers at step 98. The user can select one of the quotes provided at step 100, reject all of the quotes at step 102, or re-access the system 10 at step 76 to change the information provided and initiate recalculation of the commission.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, the various features of methods 20 and 60 may include other steps not specifically illustrated, while still remaining within the scope of the invention. Further, the particular system and methods were described with respect to the sale of real property, but may be implemented for the sale of any asset where a commission or fee is paid to an agent for selling the asset. In addition, although only a selected number of variables were discussed, any quantity and type of variables may be provided. For example, the type and quantity of variables to be provided will vary depending on the type of asset to be sold. Further, Tables A-D illustrate only example sets of variables, inputs and values that can be incorporated into the system 10 of the invention. A variety of variable combinations, values and inputs may be utilized, while remaining within the scope of the invention. For example, the costs of certain services or the types of services available may vary based on geographic location. In some embodiments of the invention, the graphical user interface (e.g., available options) changes based on the location of the real property and/or the user of the system.

Although primarily described as being accessible through a processor via a graphical user interface, the system of the invention can be accessed using a telephone using voice prompts, accessed wirelessly using a Personal Digital Assistant (PDA), etc.

What is claimed is:

1. A method of determining a commission, comprising:
   providing from a server a plurality of selectable variables to an electronic device, the plurality of selectable variables associated with a real estate asset for sale;
   receiving at the server a selection of at least one variable from the plurality of selectable variables sent from the electronic device;
   calculating at the server a commission associated with a sale of the real estate asset based at least partially on the selection of at least one variable from the plurality of selectable variables;
   providing from the server the calculated commission to the electronic device;
   receiving at the server from the electronic device an indication that the calculated commission is one of accepted or rejected;
   after the receiving, updating at the server a value associated with at least one variable from the plurality of selectable variables based on at least one of a change of market condition or a change of economic condition associated with the at least one variable from the plurality of selectable variables; and
   after the updating, recalculating at the server the commission for the same sale of the same real estate asset based on the updated value of the at least one variable from the plurality of selectable variables.

2. The method of claim 1, further comprising:
   prior to the calculating, sending from the server the selected variables from the plurality of selectable variables to at least one third party; and
   receiving at the server an input from one third party from the at least one third party, the input being a quote for a commission.

3. The method of claim 1, further comprising:
   sending from the server the selected variables from the plurality of selectable variables to at least one third party;
   receiving an input at the server from one third party from the at least one third party; and
   outputting from the server to the electronic device data associated with the input received from the one third party.

4. The method of claim 1, further comprising:
   prior to the recalculating, providing from the server to the electronic device the plurality of selectable variables at a subsequent time;
   receiving from the electronic device a selection of at least one variable from the plurality of selectable variables received at the subsequent time, the recalculating at the server of the commission being based at least partially on the at least one variable from the plurality of selectable variables selected at the subsequent time.

5. A processor-readable medium storing code representing instructions to cause a processor to perform a process, the code comprising code to:
   provide to an electronic device a plurality of selectable variables, the plurality of selectable variables associated with a real estate asset for sale;
   receive a selection of at least one variable from the plurality of selectable variables; and
   calculate a commission associated with a sale of the real estate asset based at least partially on the selection of at least one variable from the plurality of selectable variables, the calculating including assigning a value to each variable selected from the plurality of selectable variables;
   provide the calculated commission to the electronic device;
   receive from the electronic device an indication that the calculated commission is accepted or rejected;
   after the receiving, update a value associated with at least one variable from the plurality of selectable variables based on at least one of a change of market condition or a change of economic condition associated with the at least one variable from the plurality of selectable variables; and
   after the updating, recalculate the commission for the same sale of the same real estate asset based on the updated value of the at least one variable from the plurality of selectable variables.

6. The processor-readable medium of claim 5, further comprising code to:
   send selected variables from the plurality of selectable variables to at least one third party; and
   receive an input from one third party from the at least one third party, the input being a quote for a commission.

7. The processor-readable medium of claim 5, further comprising code to:
   send selected variables from the plurality of selectable variables to at least one third party;
   receive an input from one third party from the at least one third party; and
   output data associated with the input received from the one third party.

8. The processor-readable medium of claim 5, further comprising code to:
   prior to the recalculating, provide to the electronic device the plurality of selectable variables at a subsequent time,
   receive from the electronic device a selection of at least one variable from the plurality of selectable variables received at the subsequent time, the recalculating the commission being based at least partially on the at least one variable from the plurality of selectable variables selected at the subsequent time.

9. The processor-readable medium of claim 5, wherein the plurality of selectable variables includes at least one of an advertising variable, a marketing variable, an MLS listing fee, and an administrative cost.

10. A processor-readable medium storing code representing instructions to cause a processor to perform a process, the code comprising code to:
    receive at an electronic device a plurality of selectable variables from a server, each variable from the plurality of selectable variables having an associated first value;
    select at the electronic device at least one variable from the plurality of selectable variables;
    input into the electronic device data associated with a real estate asset;
    send from the electronic device the at least one selected variable to the server;
    receive at the electronic device a quote for a commission associated with a sale of the real estate asset, the quote based at least in part on the selected variable and its associated value;
    after receiving at the electronic device a quote, send from the electronic device a response to the server indicating whether the quote for a commission associated with the sale of the real estate asset is one of accepted or rejected;

after the sending a response, select at the electronic device at least one variable from the plurality of selectable variables at a subsequent time, at least one of the variables from the plurality of selectable variables received at the subsequent time having a second value different than the first value;

send from the electronic device to the server at least one selected variable from the plurality of selectable variables received at the subsequent time; and receive at the electronic device a recalculated quote for a commission for the same sale of the same real estate asset based on the variables from the plurality of selectable variables selected at the subsequent time.

11. The processor-readable medium of claim 10, further comprising code to:

send from the electronic device the at least one selected variable to at least one third party.

12. The processor-readable medium of claim 10, further comprising code to:

send from the electronic device the at least one selected variable to at least one third party the third party being different than the server; and receive at the electronic device an input at the electronic device from one third party from the at least one third party, the input being a quote for a commission associated with the real estate asset.

13. The processor-readable medium of claim 10, wherein the code to receive a quote for a commission includes code to receive a plurality of quotes for a commission associated with a sale of the real estate asset, the code to send a response includes one of accepting one of the quotes for a commission associated with the sale of the real estate asset from the plurality of quotes for a commission associated with the sale of the real estate asset or rejecting all the quotes for a commission associated with the sale of the real estate asset.

* * * * *